Sept. 21, 1971      R. W. ARNETT      3,606,714
MOLDING STRIP FOR USE AS QUIRK OR REVEAL
Filed Nov. 5, 1969      3 Sheets-Sheet 1

ROBERT W. ARNETT
INVENTOR

BY Flam and Flam

ATTORNEY

Sept. 21, 1971   R. W. ARNETT   3,606,714

MOLDING STRIP FOR USE AS QUIRK OR REVEAL

Filed Nov. 5, 1969   3 Sheets-Sheet 2

ROBERT W. ARNETT
INVENTOR

BY Flam and Flam

ATTORNEY

United States Patent Office 3,606,714
Patented Sept. 21, 1971

3,606,714
MOLDING STRIP FOR USE AS QUIRK OR REVEAL
Robert W. Arnett, Pasadena, Calif. (% Fry Reglet Corp., 3028 Dolores St., Los Angeles, Calif. 90065)
Continuation-in-part of application Ser. No. 747,385, July 24, 1968. This application Nov. 5, 1969, Ser. No. 874,328
Int. Cl. E04b *1/70;* E04f *19/04*
U.S. Cl. 52—255
16 Claims

ABSTRACT OF THE DISCLOSURE

An extruded molding strip is fitted near or at a corner of a structural base to form a quirk or reveal, eliminating the task of joining similar or dissimilar finish materials at a corner, and at the same time providing an attractive decorative effect.

RELATED APPLICATIONS

This is a continuation-in-part of application Ser. No. 747,385, filed July 24, 1968, now abandoned.

This invention relates to building construction and, more particularly, to moldings for use in providing neat corner joints, especially where different materials join. Since slight deviations from true become magnified at the corners, an acceptable corner between like materials requires time and careful effort. But where unlike materials adjoin, especially if one is cast in situ, only exceptionally painstaking effort produces an acceptable result.

The primary object of this invention is to provide a simple extrudable molding that forms a neat physical separation between the otherwise adjoining materials in such manner that the separate joints between the molding and the respective materials are themselves also neat. In one form of the invention, the molding forms a quirk or reveal that presents an architecturally pleasing result without requiring finish fitting. In another form of the invention, the molding forms an exterior dihedral separation at an external corner to provide an equally pleasing result, also without requiring finish fitting. In still another form of the invention, the molding cooperates with a sawed kerf or molded channel in a cast stone wall.

Another object of this invention is to provide new composite corner structures that provide attractive appearances.

Expansion and contraction of building structures is a common occurrence due to seismic forces, temperature changes, and designed deflection in high structures. Another object of this invention is to provide a joint of this character that retains a neat appearance despite slight separations. For this purpose, the molding of some of the forms is attached at one wall only, allowing an unnoticeable separation at the other wall.

BRIEF DESCRIPTION OF THE DRAWINGS

A detailed description of the invention will be made with reference to the accompanying drawings. These drawings are to scale. The description of the invention is of the best presently contemplated modes of carrying out the invention. This description is not to be taken in a limiting sense, but is made merely for the purpose of illustrating the general principles of the invention. Structural and operational characteristics attributed to forms of the invention first described shall also be attributed to forms later described, unless such characteristics are obviously inapplicable or unless specific exception is made.

DETAILED DESCRIPTION

Figure 1:
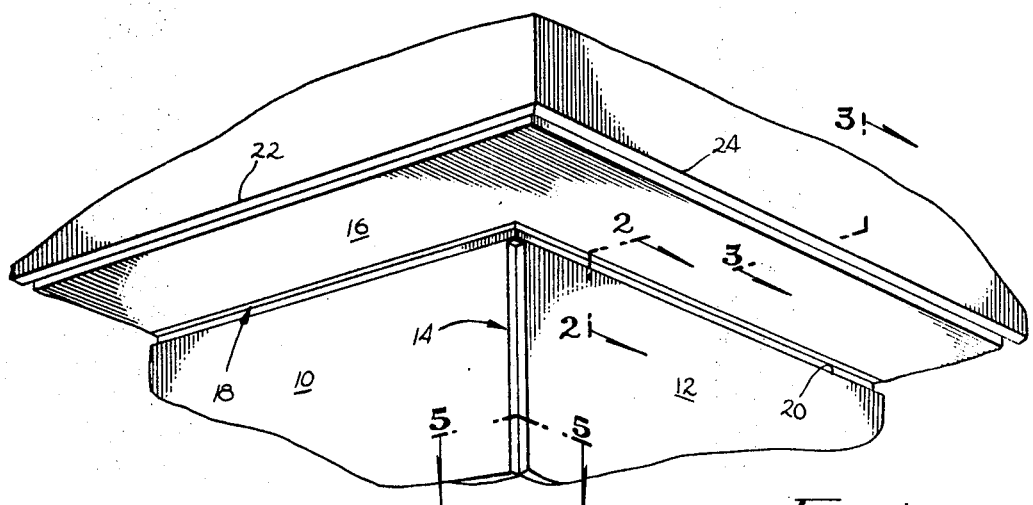
FIG. 1 is a pictorial view of a wall and ceiling illustrating several modes of use of moldings incorporating the present invention.

In FIG. 1 two vertical walls 10 and 12 meet at an external corner generally designated at 14. The walls 10 and 12 are upwardly bounded by a horizontal wall of a soffit 16 at which internal corners 18 and 20 are formed. The soffit 16 also has external corners 22 and 24. The structure shown in FIG. 1 illustrates corner structures typically encountered in building construction—an exterior corner 14 along vertical panels, an interior corner 18 or 20 between vertical panels and an overhanging ceiling or soffit structure, and an external horizontally extending corner 22 or 24.

Figure 2:
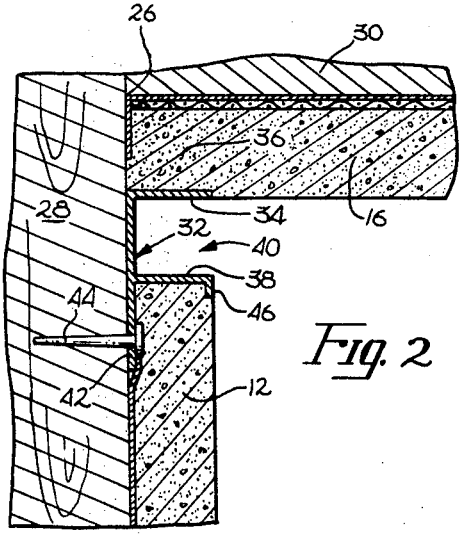
FIGS. 2, 3 and 5 are enlarged transverse sectional views taken along planes corresponding to lines 2—2 and 3—3 of FIG. 1.

FIG. 2 illustrates the interior corner between the panel or wall 12 and the soffit 16. Both walls in this instance are plaster, cast in situ. The walls are attached to base structures themselves forming a base corner 26. The base structures in this instance are wood frame elements 28 and 30.

An F-shaped extruded molding 32 is attached to one element 28 of the base structures in spaced relationship to the base corner in such manner that the top flange 34 of the molding forms a slot 36 extending from the base corner 26 along the other base element 30 and such that the lower flange 38 of the molding forms a ground with an open quirk or reveal 40 between the molding flanges. The slot 36 forms a space for the end of the horizontal cast wall, and the ground forms a terminus for the upper end of the vertical cast wall. The flanges 34 and 38 form accessible end members to which the in situ cast walls can be readily finished by the plasterer.

The molding 32 has a tail piece 42 tacked to the base element 28 by nails 44 which are covered by the wall 12. The end of the lower flange 38 has a turned edge 46 that provides a decorative effect by exposing a narrow strip that may be metal or colored plastic.

The molding 32 may be installed at either base element 28 or 30. In the position shown, the quirk or reveal opens horizontally beneath the upper bounding wall; by attaching the molding 32 to the other element 30, the quirk or reveal will open downwardly at the end of the top wall.

Figure 8:
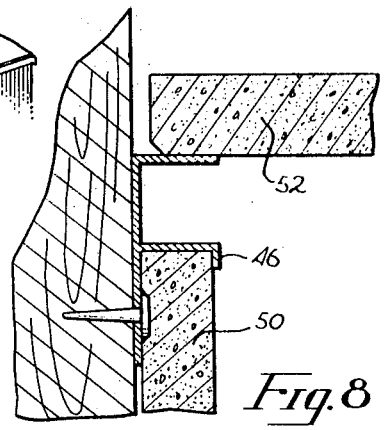
FIGS. 8 and 9 are enlarged sectional views taken along planes corresponding to lines 8—8 and 9—9 of FIG. 7.

The corner structure shown in FIG. 8 is similar to that shown in FIG. 2, except that the walls 50 and 52 are precast dry plaster walls. The edge 46 in this instance additionally serves to clasp the panel 50. The element 42 may be a suspended ceiling tile.

Since only the tail piece 42 is tacked in place, a movement of the base element to which it is tacked in a direction away from the other base element will not produce any break in the materials. Instead, an unnoticeable clean separation will result.

Figure 3:
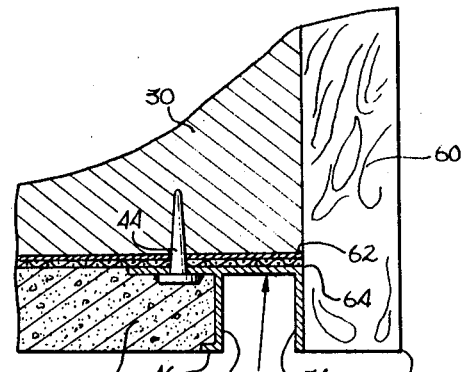

FIG. 3 shows the corner 24 between the horizontal soffit wall 16 and the vertical soffit panel 60. The base structure 30 provides an exterior corner 62. The molding 32 is attached to the base structure 30 in such manner that the flanges 34 and 38 extend downwardly with the corner 64 at the base of the upper flange substantially coinciding with the base structure corner 62. The flange 38 provides a ground for the plaster material of the horizontal wall of the soffit, while the flange 34 provides an abutment surface for the vertical soffit panel 60. The panel 60 may be of any preformed material. In this arrangement, the finish corner 66 is provided by the vertical panel 60, the quirk or reveal opening downwardly.

Figure 5:
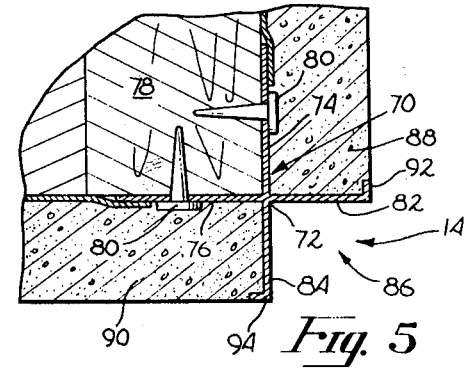
Figure 10:
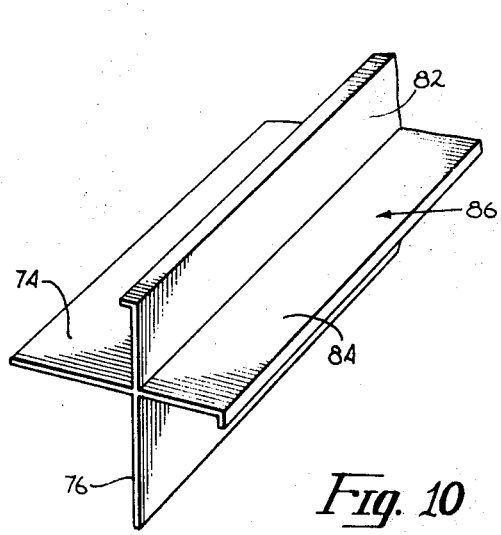
FIG. 10 is a pictorial view of a length of another of the moldings incorporating the present invention.

FIG. 5 shows the exterior vertically extending corner 14. This corner is formed by an X-molding 70 having four legs radiating from an apex 72 at 90° relationship. Two adjacent legs 74 and 76 are flat and form a corner at the apex 72 fitted to the corner of the base structure 78 and attached by adhesive or by screws or nails 80. The other legs 82 and 84 form an exposed dihedral angle 86 between the legs 82 and 84 while the respective legs form grounds for plaster walls 88 and 90 cast in situ. The legs 82 and 84 have turned edges 92 and 94 forming decorative strips. See also FIG. 10.

Figure 6:
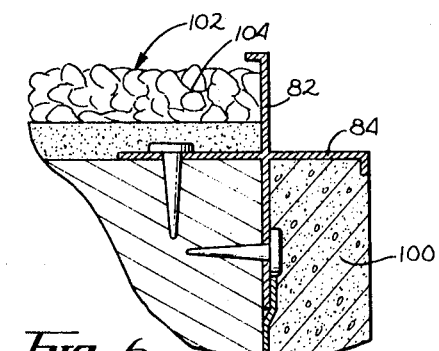
FIG. 6 is a view similar to FIG. 5 illustrating a modified wall structure.

FIG. 6 illustrates the same molding structure forming an exposed dihedral angle between wall panels or sections of different characteristics. One wall section 100 is plaster cast in situ and the meeting wall section 102 is a composite, the outer surface of which is formed by an aggregate 104. The legs 82 and 84 form grounds forming suitable neat edges for both wall sections.

Figure 9:
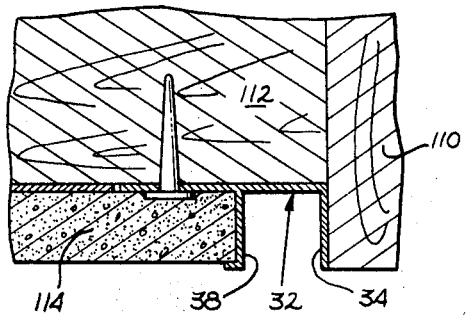

FIG. 9 illustrates the use of the F-section molding at a door jamb 110. The jamb 110 extends beyond the frontal surface of the adjoining wall element 112 by an amount corresponding to the height of the flange 34 along which the jamb is abutted. The lower flange 38 forms the end trim of a precast dry wall panel 114.

Figure 4:
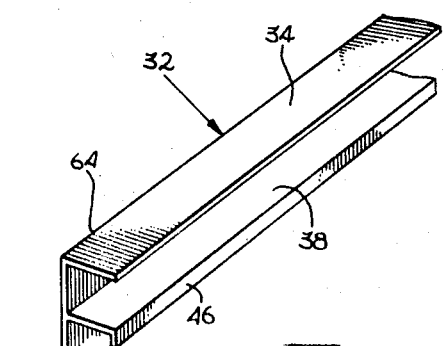
FIG. 4 is a pictorial view of a length of one of the moldings incorporating the present invention.
Figure 7:
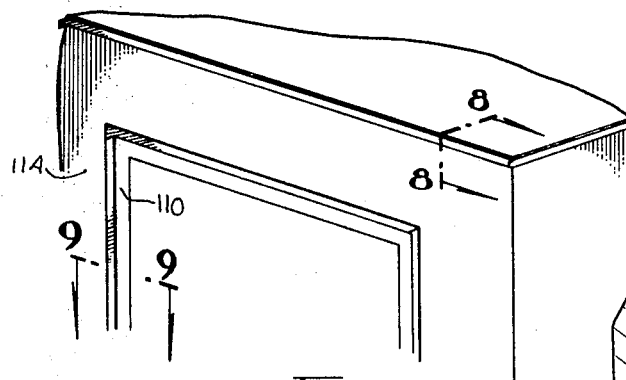
FIG. 7 is a pictorial view of another wall and ceiling showing other modes of use of the moldings incorporating the present invention.
Figure 11:
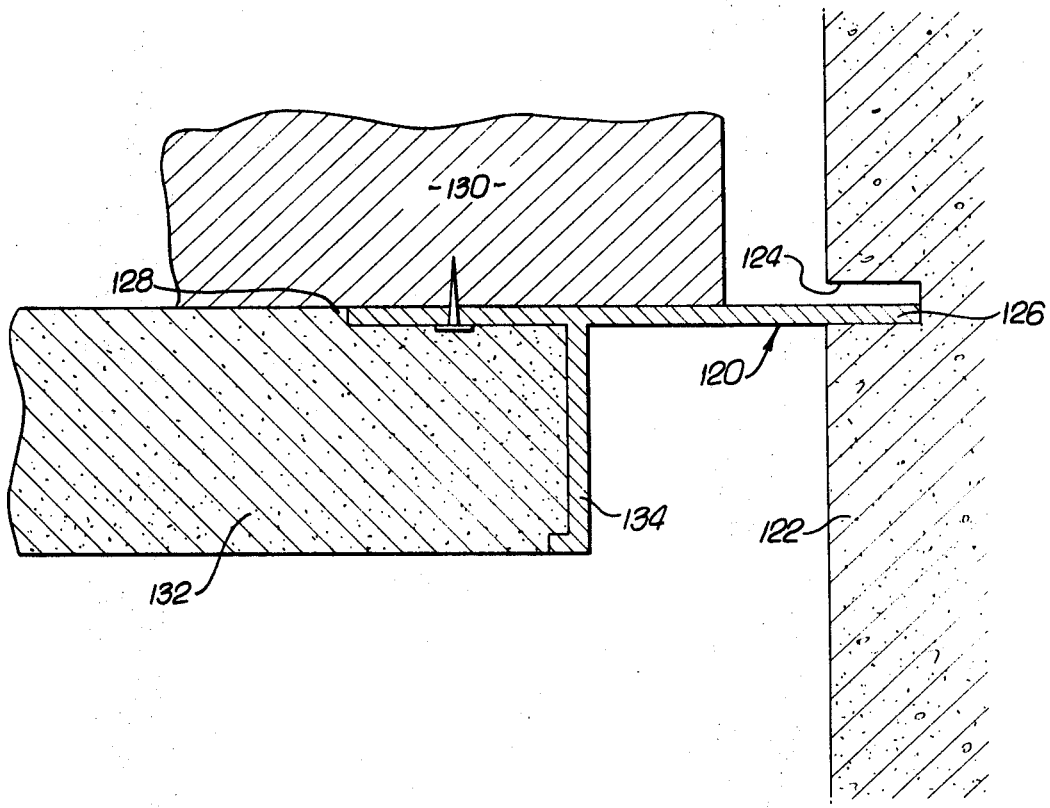
FIG. 11 is a sectional view similar to FIG. 3 showing another modified form of the present invention.

The T-shaped molding 120 shown in FIG. 11 is similar to the molding 32 shown in FIG. 4, except that the molding is designed to cooperate with a cast stone wall in a different manner. Thus, the wall 122 is provided with a sawed kerf 124 that receives one end 126 of the molding. The other end 128 of the molding is attached to the base structure 130 of a wall that extends at right angles to the stone wall 122. Finish material 132 is installed on that side of the T-shaped molding remote from the stone wall 122; the other side of the T-shaped molding is left open and thus forms the reveal. The molding 120 has a flange 134, corresponding to the flange 38 of the form of FIG. 4, to form a ground for the finish material 132. Slight movement of the base structure 130 away from the wall may result in the end 126 moving outwardly of the kerf 124. This will not be visible unless the movement is extreme. Shifts parallel to the kerf are also tolerable.

I claim:

1. For use with a building structure having base elements forming a corner, the combination therewith of: a molding strip of substantially uniform cross-section designed to form an open groove adjacent said base corner, said strip having a first flange part having provisions at one end for attachment to said structural base along one side of said base corner and a straight second part extending outwardly relative to the said first part and substantially at right angles to said first part and located intermediate the ends of said first part and forming a corner with said one end of said first part, the inside of the corner receiving first finish material, the other end of said one flange part fitting second finish material and forming an exteriorly opening groove along the outside of said molding strip corner.

2. The molding strip as set forth in claim 1 together with means for fastening the strip only at its said first part.

3. The molding strip as set forth in claim 1 together with a third part extending laterally of the first part on the opposite side of said second part whereby said strip has a substantially X-shaped configuration having four corners, two diagonally opposite corners receiving said first and second finish material respectively and the other two diagonally opposite corners respectively fitting the base corner and being open.

4. The molding strip as set forth in claim 1 in which said other end of said one part forms a stop for said second finish material.

5. The molding strip as set forth in claim 4 in which said other end of said one part is angled whereby said strip has a substantially F-shaped configuration.

6. The combination as set forth in claim 1 in which said other end of said one part is designed to project partially into a channel formed in said second finish material.

7. The combination as set forth in claim 6 together with means for fastening the strip only at its said first part to allow for movement of the walls at the corner.

8. In a building structure: a structure base having two walls forming an inside corner; a substantially F-shaped molding strip having a channel part and an attaching part adjoining the channel part substantially as an extension of the bottom of the channel part; the bottom of said channel part and said attaching part extending along one wall at the corner in spaced relationship to the other wall with the channel part nearer the corner than said attaching part; first finish material extending along the said other wall at said corner and on the outside of said channel part; and second finish material extending along the said one wall of said corner and overlying said attaching part.

9. The combination as set forth in claim 8 in which said first finish material is a preformed ceiling nodule or the like.

10. The combination as set forth in claim 8 in which said first and second finish material are cast in situ.

11. The combination as set forth in claim 8 together with means for fastening the strip only at said attaching part to allow for slight movement of said walls.

12. In a building structure: a base structure having an outside corner; a substantially X-shaped molding strip having four legs with adjacent legs extending in right-angle relationship with respect to each other from a common apex, a first two of the legs forming a corner fitted to said outside base corner; finish material overlying said first two legs respectively and extending to the second two remaining legs respectively whereby an open corner reveal is formed, said second two legs having substantially equal widths measured from said common apex whereby a substantially symmetrical corner appearance is provided.

13. In a building structure: a first wall having a channel groove formed therein; a base structure for a companion wall and extending at right angles to said first wall in substantial alignment with said channel; a substantially T-shaped molding having one end attached to said base and its other end entering said channel with the flange extending outwardly of said base in spaced substantially parallel relationship to said first wall to form a quirk or reveal; and finish material applied to the base over said one end and in abutting relationship to said flange.

14. The combination as set forth in claim 13 in which said other end is otherwise unattached to said first wall to allow for slight relative movement of said walls.

15. In a building structure: a base having an outside corner; first finish material attached to the base along one part of the corner and extending beyond the corner to overhang it; an F-shaped molding strip extending along the other part of the corner so that the channel part of the strip adjoins the first finish material to open in the same direction that said finish material overhangs; means extending through the remaining part of said strip to secure the strip to said base; and second finish material attached to the base and abutting the outside of said channel as well as overlying said other part of said molding strip to conceal said securing means.

16. For use with a building structure having base elements forming a corner, the combination therewith of: a molding strip of substantially uniform cross-section designed to form an open groove adjacent said base corner, said strip having a first flange part having provisions at one end for attachment to said structural base along one side of said base corner and a straight second part extending outwardly relative to the said first part and substantially at right angles to said first part and located intermediate the ends of said first part and forming a corner with said one end of said first part, the inside of the corner receiving first finish material, the other end of said one flange part fitting second finish material applied to the structure along the other side of said base corner, said other end of said one part forming an exteriorly opening groove along the outside of said molding strip corner.

References Cited

UNITED STATES PATENTS

| | | | |
|---|---|---|---|
| 632,007 | 8/1899 | Broome | 52—371 |
| 1,676,582 | 7/1928 | Stuart | 52—27 |
| 1,798,839 | 3/1931 | Gross | 52—285 |
| 1,831,162 | 10/1931 | Crowell | 52—238 |
| 1,910,554 | 5/1933 | Loehr et al. | 52—254 |
| 2,618,818 | 11/1952 | Kublanow | 52—716 |
| 2,802,359 | 8/1957 | Hollister | 52—238 |
| 3,370,390 | 2/1968 | Livermore | 52—287 |
| 3,393,484 | 7/1968 | Dunnington | 52—716 |
| 3,387,419 | 6/1968 | Kamberg et al. | 52—287 |
| 3,486,283 | 12/1969 | Arnett | 52—716 |

FOREIGN PATENTS

| | | | |
|---|---|---|---|
| 492,368 | 4/1953 | Canada | 52—285 |

FRANK L. ABBOTT, Primary Examiner

J. L. RIDGILL, JR., Assistant Examiner

U.S. Cl. X.R.

52—288, 738